Oct. 15, 1935.  B. GIUNTINI  2,017,813
APPARATUS FOR MEASURING THE FOOT
Filed Sept. 5, 1931  5 Sheets-Sheet 1
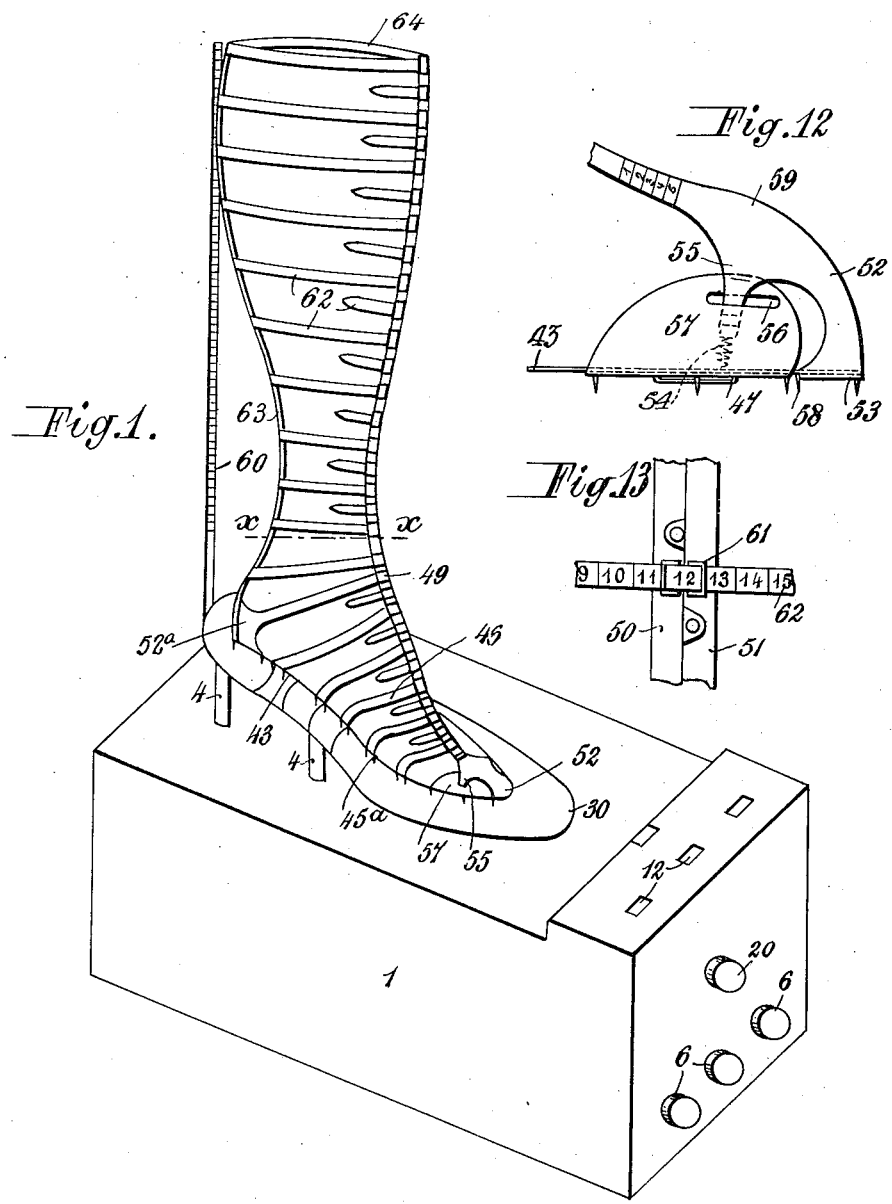
INVENTOR
BRUNO GIUNTINI
BY
ATTORNEY Oct. 15, 1935.    B. GIUNTINI    2,017,813
APPARATUS FOR MEASURING THE FOOT
Filed Sept. 5, 1931    5 Sheets-Sheet 2
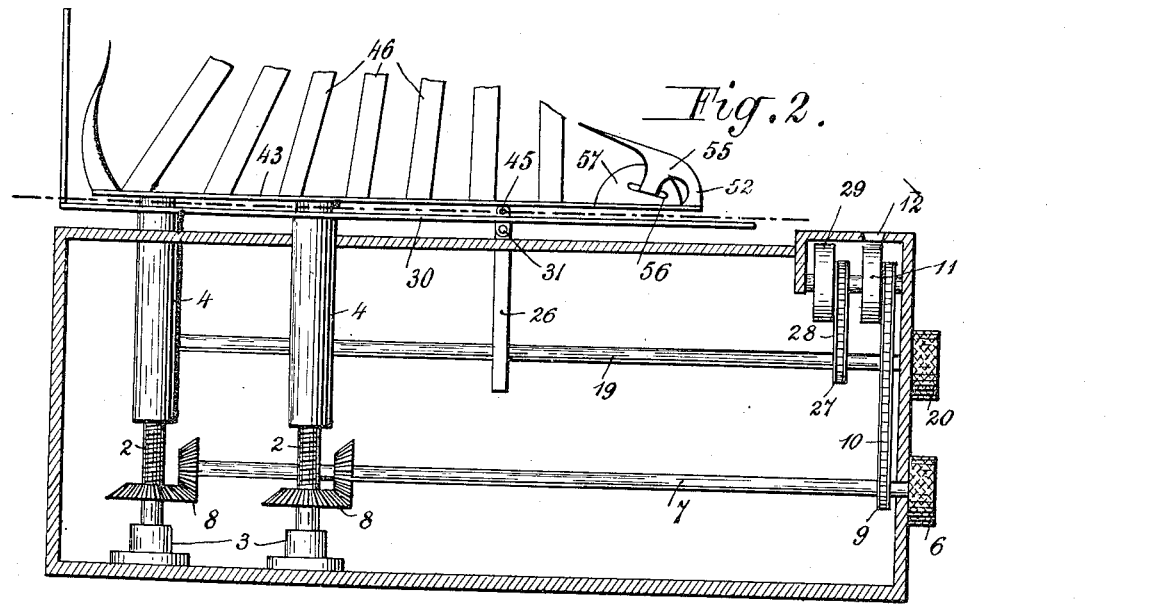
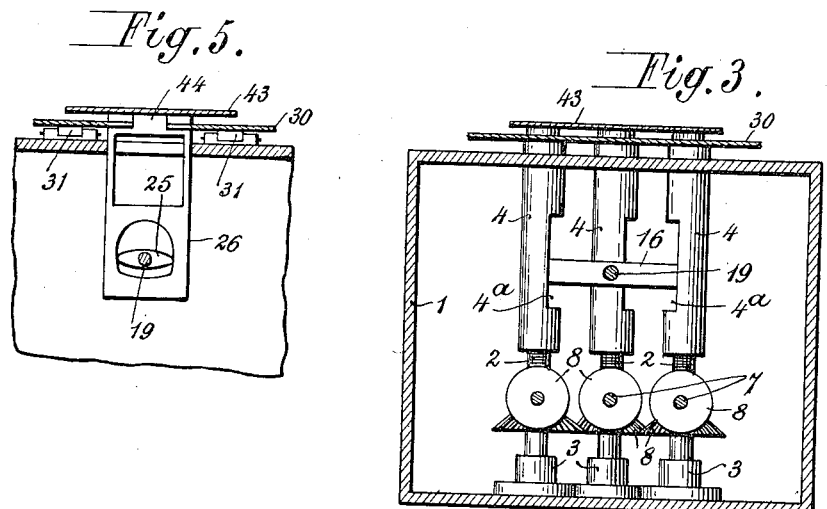
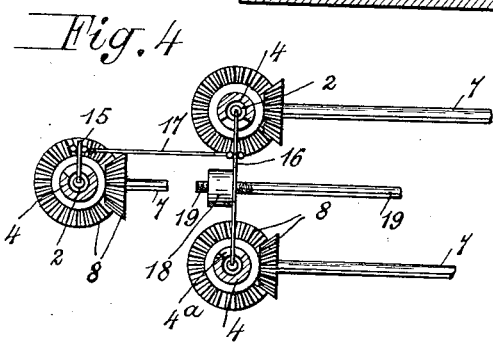
INVENTOR
BRUNO GIUNTINI
BY
ATTORNEY Oct. 15, 1935.   B. GIUNTINI   2,017,813
APPARATUS FOR MEASURING THE FOOT
Filed Sept. 5, 1931   5 Sheets-Sheet 3

INVENTOR
BRUNO GIUNTINI
BY
ATTORNEY

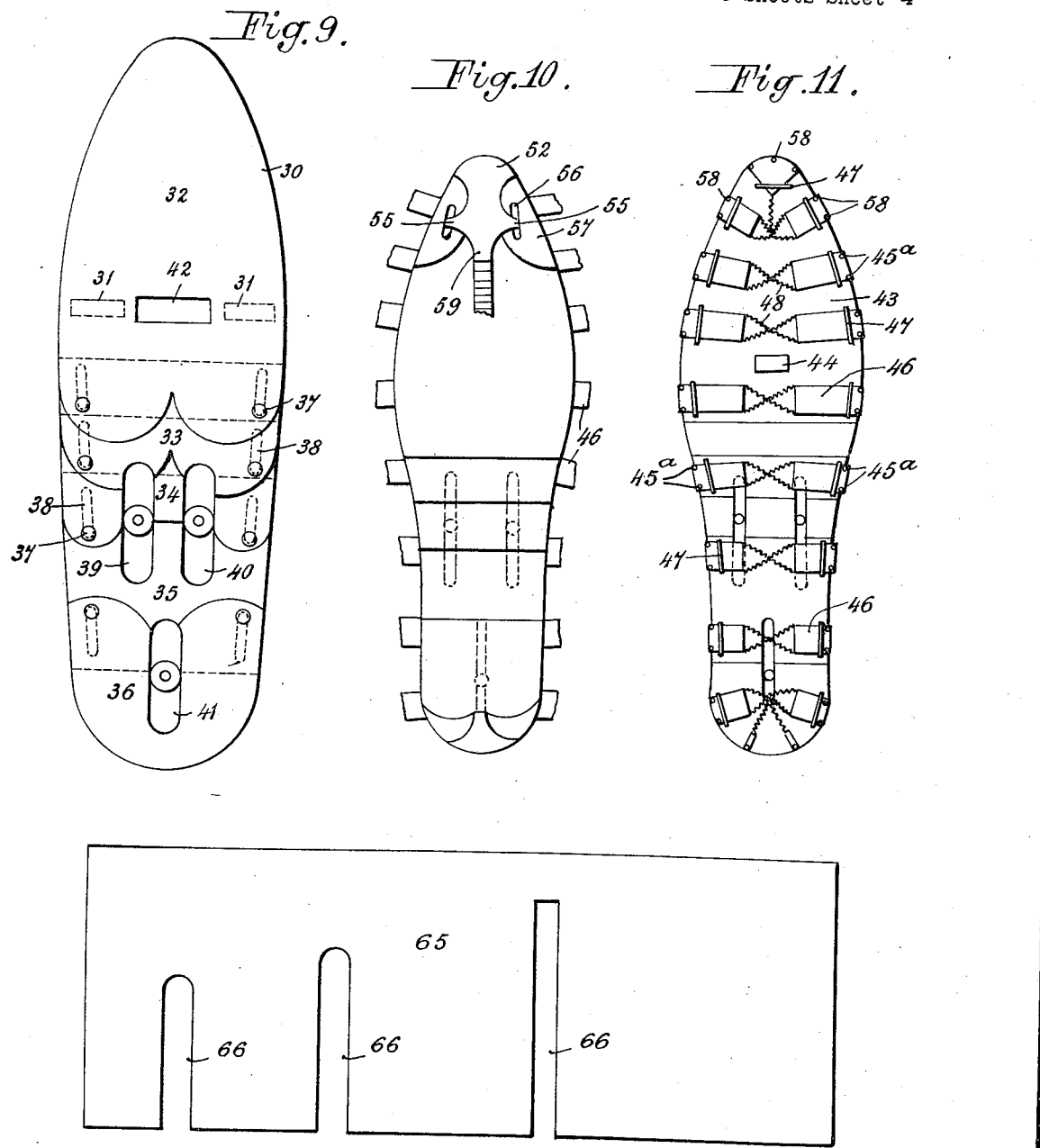

Oct. 15, 1935.  B. GIUNTINI  2,017,813
APPARATUS FOR MEASURING THE FOOT
Filed Sept. 5, 1931  5 Sheets-Sheet 5
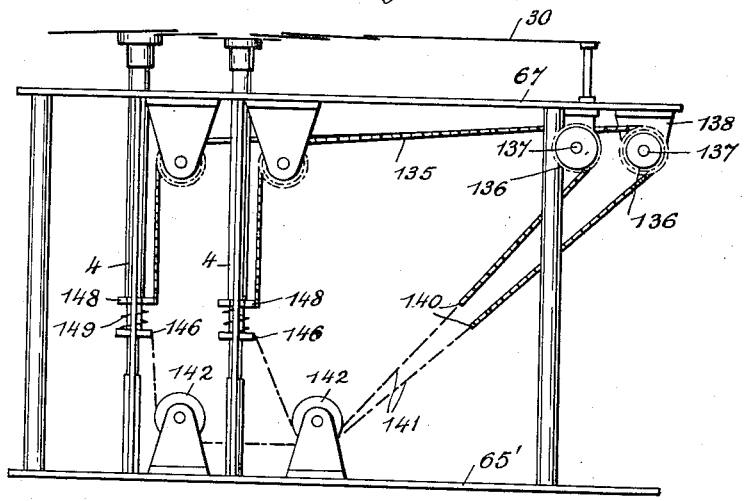
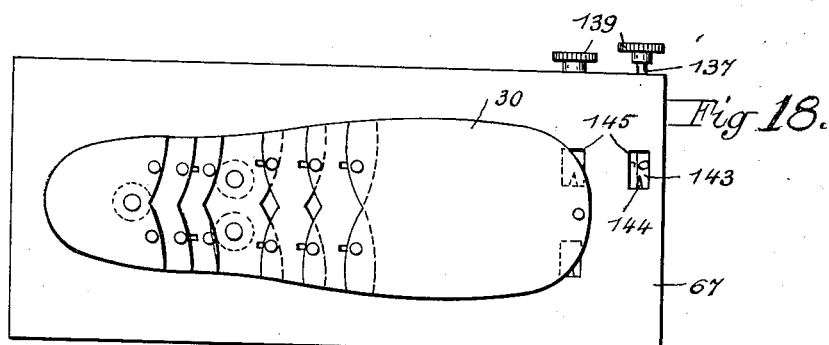
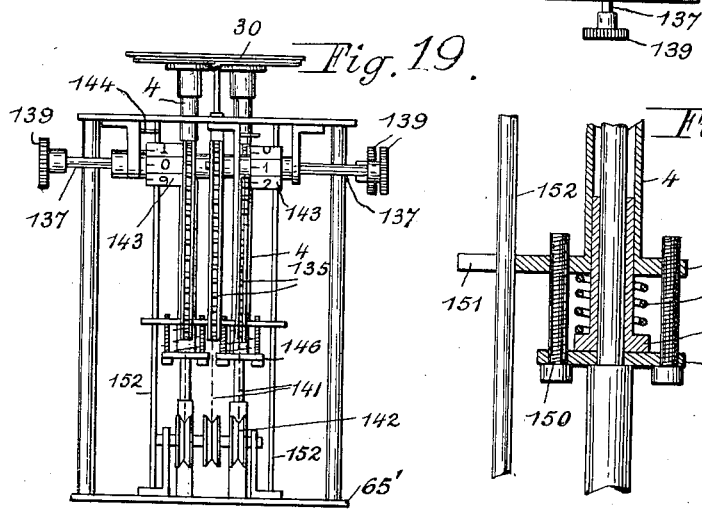
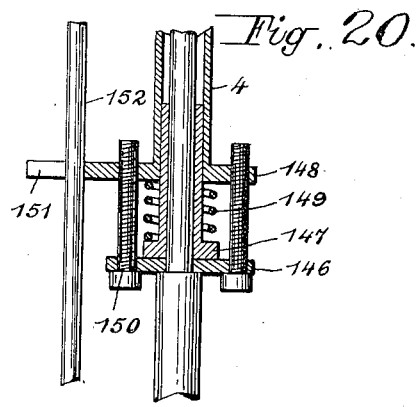
INVENTOR
BRUNO GIUNTINI
BY
ATTORNEY Patented Oct. 15, 1935

2,017,813

UNITED STATES PATENT OFFICE 2,017,813

APPARATUS FOR MEASURING THE FOOT

Bruno Giuntini, Alger, Algeria

Application September 5, 1931, Serial No. 561,378
In France September 15, 1930

7 Claims. (Cl. 33—3)

The present invention relates to an apparatus adapted for the exact measurement of a part of the body or of any suitable object, and chiefly for measurements of the foot and the leg as concerns the forms of footgear, taking due account of all forms which are not symmetrical.

The said apparatus comprises a plurality of supports which are adjustable in height and upon which is mounted a flexible base plate, above which is a flexible plate provided with transverse graduated bands attached to members which are slidable and elastic, and are provided with pointed members at the bottom. The two plates may be given the proper shape when the foot is placed upon them. The upper plate may then be separated from the base plate, in order to provide for the insertion of a sheet of paper, which is indented by the said pointed members, by pressure, after the said bands have been attached around the foot by a suitable tension. The said apparatus is adapted to measure both feet.

In order to measure the height of the upper of the boot or shoe, and the size of the leg, the plate is extended by a vertical rod and a flexible band, which are provided at intervals with graduated straps. The form of the heel and the toe are found by means of suitably shaped members which are jointed and carry graduated scales. For an exact record of the irregular surface of the sole of the foot, the base plate carries a flexible device which follows all the distortions of the said plate. A suitable device serves to hold the foot in the center of the apparatus and to measure the ankle. The thickness and shape of the instep are measured by a device which fits exactly around the foot.

The accompanying drawings show by way of example an embodiment of the invention.

Fig. 1 shows the apparatus in the operative position.

Fig. 2 is an elevational view of the internal mechanism, with one side of the box removed.

Fig. 3 is a vertical section of the rear part.

Fig. 4 is a horizontal section of the parts shown in Fig. 3.

Fig. 5 is a vertical section of the central part.

Figs. 8 and 9 are respectively an elevational and a plan view of the base.

Figs. 10 and 11 are respectively a top and a bottom view of the plate carrying the graduated bands.

Fig. 12 shows the part adapted to take the form of the front end of the foot.

Fig. 13 represents the manner in which the ribbons or bands supporting the sliding members are fixed.

Fig. 14 represents the sheet of paper on which are recorded the different measurements and the outline of the foot.

Figs. 17, 18 and 19 are respectively an elevational, a plan, and an end view of a modification.

Fig. 20 is a vertical section on a larger scale showing a detail of Fig. 17.

Figure 6:
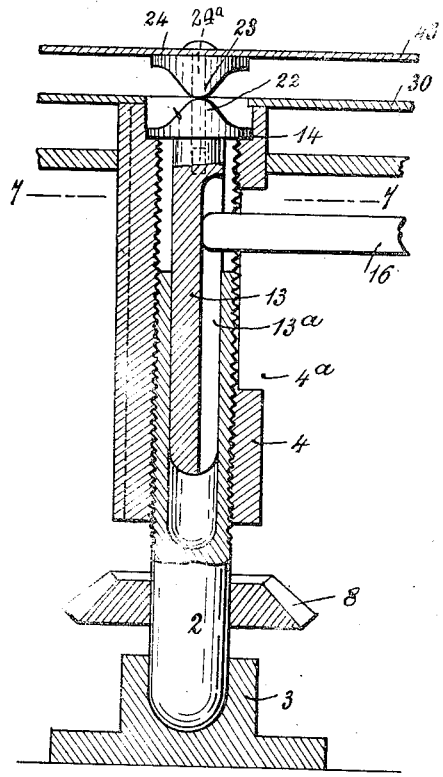
Fig. 6 shows a detail on a larger scale.
Figure 8:
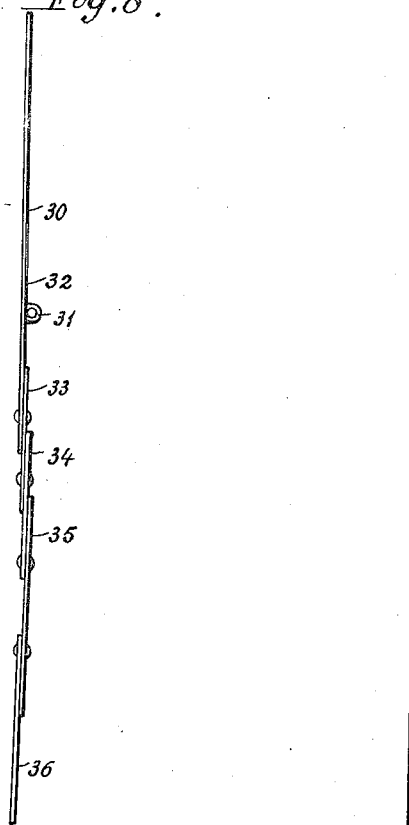

The said apparatus comprises a box 1, upon the bottom of which are mounted, on end, three rods 2 which are rotatable in corresponding step-bearings 3; said rods are threaded and are engaged in tapped sockets 4 which are guided by ribs 5 in the upper side of the box in such manner that they may slide vertically but are held against rotation. The said rods can be rotated by operating knobs 6 mounted on shafts 7 which are connected by said rods by bevel gearing 8.

At the same time, the said shafts, by means of sprocket wheels 9 and chains 10, turn the graduated disks 11, in such manner that a given number on a disk will appear in a respective aperture 12 in the upper side of the box, corresponding to the various positions of the rods 2. When the rods rotate, they will raise the sockets 4 more or less, and the numbers on the drums 11 can be observed in order to take account of the heights of the different points of the person's foot which rests upon the ends of said sockets. Thus the rear socket serves to measure the height of the heel, and the other two serve to measure the heights on each side of the instep.

In practice, the foot does not rest directly upon the ends of the sockets 4, but the following arrangement is employed: In the rods 2 are slidable the rods 13 having heads 14 resting upon offsets formed at the upper ends of the said sockets. In the said rods are longitudinal grooves 13a into which are inserted, for the rear rod, an arm 15, and for the other two rods, a cross-piece 16 extending into the sockets through the apertures 4a.

The arm 15 is connected with the cross-piece 16 by a link 17, and the central part of the cross-piece 16 carries a socket 18 which has a tapped hole into which is inserted a screw 19. Said screw 19 is supported by the box 1, and it is provided at the front part with an operating knob 20. Thus by turning this knob, the screw will move the socket 18 forward or back, and with it the cross-piece 16 and the arm 15, by which all the rods 13 are rotated at the same time.

Each rod 13 has at the top a head 14 provided with a boss 22 in contact with a like boss 23 pertaining to a disk 24 mounted on the under side of a plate 43. These parts are connected by a pin 24a as shown in Fig. 6. The axial channel in which this pin rests extends below the end of the pin, so that the latter can descend with the parts 24 and 43. The connecting pin 24a thus never protrudes above the plate 43. To the screw 19 is secured a cam 25 of suitable outline, cooperating with a strap 26, and with a sprocket wheel 27 connected by chain 28 with a wheel 29 carrying a graduated scale. On the top of the sockets 4 is a base plate 30 which is attached by lugs 31 to the top of the box, thus pivoting upon the assembling axles or pins which extend into the lugs 31 as indicated in Figs. 2 and 5.

Figure 7:
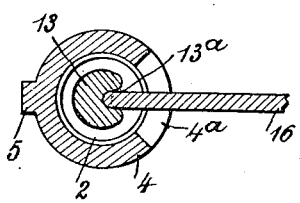
Fig. 7 is a section on the line 7—7 of Fig. 6.
Figure 16:
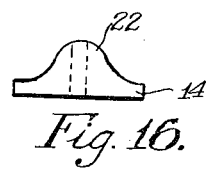
Figs. 15 and 16 are plan and side views, respectively, showing a detail of Fig. 6.
Figure 15:
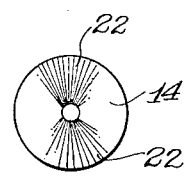

The cross-piece 16 (Figs. 6 and 7) in moving parallel to itself, can impart to the rods 13 a rotation of about 30° to 40° which is sufficient to permit the bosses 23 to descend into the spaces between the bosses 22 permitting plate 43 to be lowered. The head 14 with its bosses 22 is shown in Figs. 15 and 16. The disks 24 are exactly the same shape, but they are turned with the bosses 23 underneath. In their position of rest (Fig. 6) the bosses 23 have their tops resting on the tops of bosses 22. When the heads 14 are turned at a certain angle, for example between 30° and 40°, the bosses 22 and 23 no longer face one another and the disks 24 can descend with the plate 43.

The said base plate 30, made of a flexible material, consists of several parts 32—33—34—35—36 which are connected together by rivets extending through slots 38, in order to increase or reduce the length. Slots 39—40—41 give passage to the heads of the sockets 4, and an aperture 42 affords passage to the strap 26. Above base plate 30 is a plate 43 corresponding to the shape of the foot, this having the same extensible construction as the base plate 30; said plate 43 is fixed on the disks 24 as shown in Fig. 6, and is also secured to the strap 26 by lugs 44 adjacent axle 45 as shown in Figs. 2 and 5.

When in the inoperative position, the heads 14 and the disks 24 are in contact by the ends of the bosses 22—23 (Fig. 6) thus leaving a space between the base plate 30 and the plate 43 into which may be inserted a sheet of paper (Fig. 14) which is slotted at 66 for the insertion of the heads of the sockets and the securing lugs, upon which the outline of the foot is inscribed by means of pointed members. Said outline is obtained by pointed members 45a secured to graduated bands 46 slidable in straps 47 mounted on the plate 43 as shown in Fig. 11, said bands being attached to the center of the plate by spiral springs 48. The bands 46 face each other in pairs as shown in Figs. 10 and 11. In each such pair, one of the bands carries a buckle 49 in which the other band engages.

The bands 46 serve to take the different dimensions of the foot. The measurements of the front end and of the heel are made by similar means. Fig. 12 shows the part adapted to take the form of the front end. This part comprises an end portion 52 resting upon the plate 43 and slidable thereon; it is provided at the bottom with a lug 53, guided by a strap 47 and is urged downwardly by a spring 54. At each side of the member 52 is an appendage 55 which carries a graduated scale and is slidable in a slot 56 in the respective members 57 against which the end of the foot is placed and which operate in a manner similar to the member 52.

In order to inscribe the outline of the foot upon the paper, each graduated band, as well as the ends corresponding to the front part and the heel, are provided with pointed members 58 adapted to perforate the paper when the knob 20 is turned. At the end of the member 52 is a tongue 59 to which are attached the bands supporting the said buckles 49. To take the exact height of the upper of a boot or shoe, the rear part of the base plate 30 carries a graduated rod 60.

The apparatus described above is particularly adapted to take measurements of feet and legs for the making of boots and shoes, but it is also adapted to take measurements of and for other objects including measurements for low shoes, and for this last mentioned purpose it is simply necessary to loosen the portion of the said bands used to measure the legs, above the line $x$—$x$ in Fig. 1.

The operation for making measurements upon the right or left foot, is as follows:

In order that the foot may be properly placed upon the plate 43, the apparatus is loosened by spreading the end member 52 and the sides 57, as well as the member forming the heel. If the length of the plate 43 is not sufficient to receive the foot, the plate is lengthened by sliding its parts one upon the other.

The several members are then put in place, applying them upon the foot with a moderate pressure. When the person feels at ease both at the front and rear of the foot, the central knob 6 is turned, and this acts through the bevel gearing 8 upon the screw 2 so as to raise the rear end of the foot to the height desired for the heel. Then the other two knobs 6 are turned in order to obtain the exact heights of the instep. When these heights have been regulated, the upper band is inserted into its buckle, employing if necessary a plumb line passing through the front end of the foot. The plumb line permits placing the foot and leg exactly vertically. The axis or line on which the buckles 49 are placed should be exactly on the median line of the foot in order to obtain exact measurements of one-half the periphery of the foot, on the right or the left side. The various bands are then inserted into their respective buckles and tightened according to the desires of the individual.

When this has been done, the operator inscribes upon the sheet of paper the dimensions indicated by the open buckles and also the dimensions shown by the front and rear parts.

After inserting the sheet of paper between the plate 43 and the base-plate 30, he turns the knob 20 in order to move the cross-piece 16 and the arm 15, thus turning the rods 13, and hence the bosses 22 of the heads 14 will enter the recesses of the bosses 23 of the members 24, secured to the plate 43. At the same time, the cam 25 acts upon the strap 26 and lowers the front part of the plate 43. The pointed members 45a and 58, situated below each band and at the ends, will perforate the paper, thus affording an exact record of the shape of the foot.

The operator notes upon the sheet of paper 65 the indications shown in the apertures 12 for the height of the heel and the instep.

For measurements of the leg, the buckles will be replaced by U shaped members 61 mounted upon two bands of cloth fabric or leather 50—51 which are attached to one another by clasps, as in the case of the edges of corsets as shown in Fig. 13. The members 61 are placed against one another so as to form frames, and the graduated bands 62 proceed below them; the scale-divisions on the bands are shown in the said frames. The bands are secured alternately on one side and the other of a strip 63 which is attached to the member 52a, and is maintained upon the leg by a belt 64 which also secures the band 50—51.

This affords an exact measurement of one-half of the periphery of the leg, alternately on the right and the left side, provided the plumb-line is used in order to situate the bands 50—51 exactly in the axis of the leg (such axis being the median line on the front or rear side of the leg).

It will be evident that the leg measuring apparatus described above is intended primarily for use in the manufacture of boots and high shoes; and that for ordinary shoes without shanks it is unnecessary to use the mechanism located above line x—x in Fig. 1.

The bands 50—51 may be brought together at the rear of the leg instead of at the front; the members 61 may be secured, for measuring purposes upon the front band or the rear band.

It will be thus observed that it is simply necessary to observe the different figures appearing in their apertures or in the buckles, in order to obtain, in conjunction with the record of the sole upon the paper, all the data necessary for the form of the footgear.

The sockets need not be actuated by gearing and screws, but may be controlled by means shown in Figs. 17 to 20. The arrangement comprises a base plate 65' and an upper part 67, but the sockets 4 are not moved by means of screws, but are moved vertically by means of chains 135 which are driven by sprocket wheels 136 mounted on shafts 137 operating in bearings 138 secured to the bottom of the upper part 67. Said shafts are provided with controlling knobs 139.

In order to return the sockets 4 to the inoperative position, the end 140 of each chain is provided with a spring 141 passing over rollers 142, and the other end of each of said springs is secured to a socket 4. In this manner, according to the direction in which the knobs are turned, the sockets 4 will be moved upwardly or downwardly.

In order to record the various distortions of the base plate 30, graduated drums 143 are mounted on the shafts 137, and the graduations may be read in each case with reference to a mark 144 provided in each aperture 145.

For the exact adjustment of the base plate 30, a device is used with the sockets 4 by which their length may be varied; this comprises a plate 146 carrying a bearing piece 147, on the upper part of which the socket 4 is mounted, said socket being provided at the lower part with a plate 148; between this latter and the bearing 147 is mounted a spring 149. The device is adjusted by two screws 150 in contact with the plate 146. The plate 148 is provided with a fork 151 which is slidable on a rod 152 and holds the socket 4 against rotation.

I claim:

1. Apparatus for taking measurements of a part of the body and particularly of the foot, comprising a support, a flexible base plate having its front portion mounted on said support, a vertical socket supporting said plate adjacent its rear end, two other vertical sockets supporting said plate arranged one beside the other in front of the first socket, means for raising and lowering said sockets independently of each other and means for indicating the position of each socket.

2. Apparatus for taking measurements of a part of the body and particularly of the foot, comprising a support, a flexible and extensible plate having its front portion mounted on said support, a vertical socket supporting said plate adjacent its rear end, two other vertical sockets arranged one beside the other and supporting said plate in front of said first socket, vertical screws engaging interior tappings of said sprockets, means for turning said screws independently of each other to raise and lower said sockets and means for indicating the height of said sockets.

3. Apparatus for taking measurements of a part of the body and particularly of the foot, comprising a support, a flexible and extensible plate having its front portion mounted on said support, a vertical socket supporting said plate adjacent its rear end, two other vertical sockets arranged one beside the other and supporting said plate in front of the first socket, vertical screws engaging interior tappings of said sockets, means for turning said screws independently of each other to raise and lower said sockets, means for indicating the height of said sockets, a second extensible and flexible plate arranged parallel to and above the first plate, vertical rods in said screws carrying heads resting in recesses at the upper ends of the sockets and provided with upper bosses, disks fixed to the lower surface of the second flexible plate and carrying lower bosses resting on the upper bosses of said heads, means for simultaneously turning said rods with their heads to lower said second plate, a vertical strap crossing said first plate and supporting the forward part of said second plate and means for lowering said strap simultaneously with the rotation of said rods, bands adapted to slide transversely on said second plate, and pointed members on the underside of said bands adapted to indent a sheet of paper placed between said plates upon lowering said second plate.

4. Apparatus for taking measurements of a part of the body and particularly of the foot, comprising a support, an extensible and flexible plate having its front portion mounted on said support, vertical sockets supporting the rear part of said plate, means for independently raising and lowering said sockets, means for indicating the height of said sockets, a second plate arranged parallel to and above said first plate, means for raising said second plate, bands adapted to slide transversely on said second plate, springs connected to said bands on one side of said second plate, said bands having graduations on the portions adapted to encircle the foot, buckles on the bands at one side of said second plate adapted to receive the bands at the other side of said second plate, points on the undersides of said bands in position to mark the contour of the foot on a sheet of paper placed between the two plates, side members on said second plate to receive the front portion of the foot, a convex member adapted to receive the front end of the foot and having graduated scales adjustable with respect to said side members, and a flexible band attached to the upper part of said convex member and placed along the upper median line of the foot, said buckles being placed along the last mentioned band.

5. Apparatus for taking measurements of a part of the body and particularly of the foot, comprising a support, a flexible and extensible plate having its front portion mounted on said support, a vertical socket supporting said plate adjacent its rear end, two other vertical sockets arranged one beside the other and supporting said plate in front of said first socket, chains passing on sprocket wheels and means controlled thereby for independently raising and lowering said sockets, control knobs for actuating said sprocket wheels, springs for tensioning said chains and means for indicating the vertical position of said sockets.

6. In combination in an apparatus for taking measurements for bootmakers' use: a deformable base which will adapt itself to the shape of the sole of the foot, means for conforming said base to the said shape, means for recording the deformations of said base, a deformable plate having the same construction as the base and mounted in spaced relation to said base so that a sheet of paper may be inserted between the said base and plate, graduated bands extending below the said plate comprising an elastic portion of such length as to fit around the instep and ankle, straps for guiding said bands, pointed members attached to said bands and adjacent the edges of said plate, said members extending downwardly, for insertion into the sheet of paper, means for lowering said plate upon said base to such a position that said pointed members indent the paper, a spring-tensioned end member fitting upon the front end of the foot and slidable on the end of the said plate, and graduated appendages on opposite sides of said end member.

7. In combination in an apparatus for taking measurements for bootmakers' use: a deformable and longitudinally extensible base which will adapt itself to the shape of the sole of the foot, consisting of a set of plates which are slidably connected together by rivets movable in slots, a box supporting said base, sockets which are vertically slidable and non-rotatably mounted in said box and whose ends are in contact with said plates, screws within said sockets for imparting vertical motion thereto, a deformable plate having the same construction as the base and mounted in spaced relation to said base so that a sheet of paper may be inserted between the said base and plate, graduated bands fitting around the foot and carrying downwardly extending pointed members adapted to indent the sheet of paper, a disk positioned below the said plate and carrying cam-shaped ramps on its periphery, a like disk facing the first-mentioned disk and in contact therewith, a vertical rod carrying the last-mentioned disk and rotatable on its axis in the said screws, means for turning the said rod and for moving the cam-shaped disk mounted thereon with reference to the cam-shaped disk of the plate in such manner that said plate will be lowered upon said base to such a position that said pointed members indent the sheet of paper.

BRUNO GIUNTINI.